US006302096B1

(12) United States Patent
Duncan

(10) Patent No.: US 6,302,096 B1
(45) Date of Patent: Oct. 16, 2001

(54) STOVE, HEATER AND LANTERN

(76) Inventor: Edward H. Duncan, R.D. 2, Box 95C, Ford City, PA (US) 16226

( * ) Notice: Subject to any disclaimer, the term of this patent is extended or adjusted under 35 U.S.C. 154(b) by 0 days.

(21) Appl. No.: 09/547,745

(22) Filed: Apr. 12, 2000

Related U.S. Application Data

(60) Provisional application No. 60/128,968, filed on Apr. 12, 1999.

(51) Int. Cl.[7] .............................. A47J 36/26; F21V 37/00

(52) U.S. Cl. .............................. 126/38; 126/40; 431/344; 362/93

(58) Field of Search .............................. 126/38, 40, 9 R, 126/39 R, 44, 25 R; 362/190, 93; 431/344

(56) References Cited

U.S. PATENT DOCUMENTS

| | | | | |
|---|---|---|---|---|
| D. 355,809 | * | 2/1995 | Kothrade | D7/337 |
| 2,638,085 | * | 5/1953 | Guedon | 126/38 |
| 2,744,809 | * | 5/1956 | Falligant | 126/38 |
| 3,139,879 | * | 7/1964 | Bauer et al. | 126/38 |
| 3,140,740 | * | 7/1964 | Lagreid et al. | 126/9 R |
| 3,154,065 | * | 10/1964 | Bencoe | 126/9 R |
| 3,405,703 | * | 10/1968 | Axelsson et al. | 126/38 |
| 3,430,622 | * | 3/1969 | Webster et al. | 126/38 |
| 3,648,680 | * | 3/1972 | Hein | 126/38 |
| 3,809,054 | * | 5/1974 | Bowman et al. | 126/38 |
| 3,896,784 | * | 7/1975 | Baxter | 126/38 |
| 3,933,146 | * | 1/1976 | Hastings | 126/38 |
| 3,941,116 | * | 3/1976 | Placek | 126/92 B |
| 4,091,795 | * | 5/1978 | Wells | 126/258 |
| 4,092,974 | * | 6/1978 | Zenaburo | 126/38 |
| 4,545,759 | * | 10/1985 | Giles et al. | 126/40 |
| 4,705,020 | * | 11/1987 | Hahn | 126/38 |
| 4,791,538 | * | 12/1988 | Prest | 126/39 R |
| 4,954,075 | * | 9/1990 | Francino | 126/39 R |
| 5,016,611 | * | 5/1991 | Lai | 126/258 |
| 5,094,221 | * | 3/1992 | Ho | 126/41 R |
| 5,178,422 | * | 1/1993 | Sekerchak | 126/38 |
| 5,441,037 | * | 8/1995 | Yen | 126/38 |
| 5,983,883 | * | 11/1999 | Moulder | 126/38 |

OTHER PUBLICATIONS

L.L. Bean 1999 Spring Camping Catalog, pg. 54.*

* cited by examiner

*Primary Examiner*—Sara Clarke
(74) *Attorney, Agent, or Firm*—Jones, Tullar & Cooper, P.C.; Daniel A. Sullivan, Jr.

(57) ABSTRACT

A kit, from which a stove, a heater, and a lantern can be assembled from a minimum of components. Toward accomplishing this, components of the kit can be used in the assembly of more than one of the options stove, heater, and lantern. Thus, a straight valve/aspirator unit of the kit serves for all three options, and a burner and elbow serves in both of the options stove and heater.

11 Claims, 7 Drawing Sheets

STOVE, HEATER AND LANTERN

CROSS-REFERENCE TO RELATED APPLICATION

The benefit of provisional application No. 60/128,968 filed 04/12/99 is claimed. Provisional application No. 60/128,968 filed 04/12/99 is incorporated here by reference.

TECHNICAL FIELD

The invention relates to a kit and its members, a stove, a heater and a lantern.

DISCLOSURE OF INVENTION

It is an object of the invention to provide a kit, from which a stove, a heater, and a lantern can be assembled from a minimum of components.

Another object is to provide novel stoves, heaters and lanterns.

Other objects of the invention will become apparent from the remainder of this specification as set forth below.

Toward accomplishing one or more of the objects, the kit of the invention provides components which can be used in the assembly of more than one of the options stove, heater, and lantern.

MODES OF THE INVENTION

Examples of the invention are explained on the basis of the drawings as follows.

Figure 1:
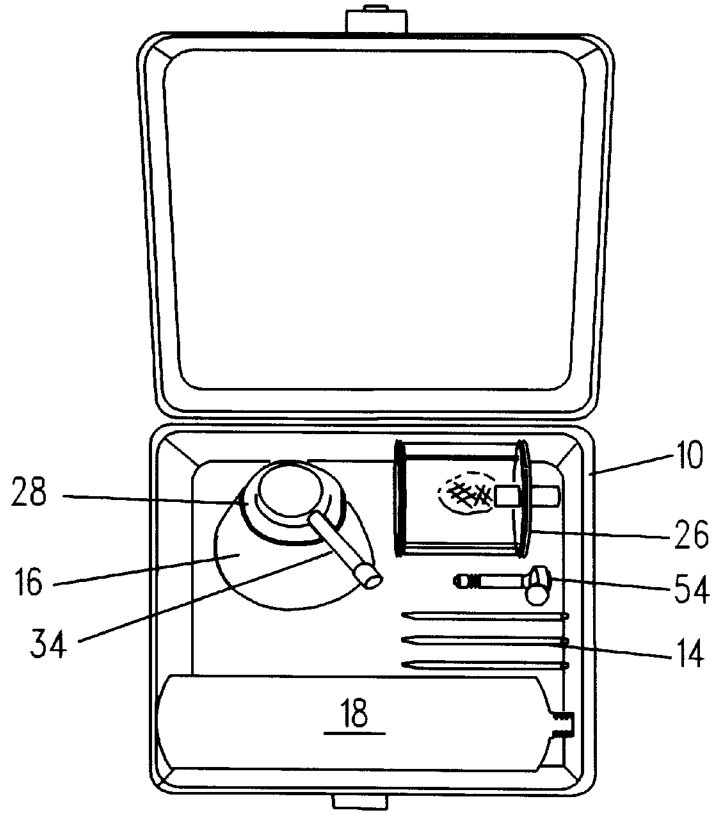
FIGS. 1 to 4 are perspective views, respectively, of a kit, stove, heater, and lantern of the invention.

FIG. 1 shows a containment case 10 of the kit of the invention, showing all components fit within the case. The case may be subdivided (not shown) or the components wrapped in bubble wrap (not shown), in order to protect the components from one another. It will be more meaningful to identify the components, after they have first been identified in the detail drawings below.

Figure 2:
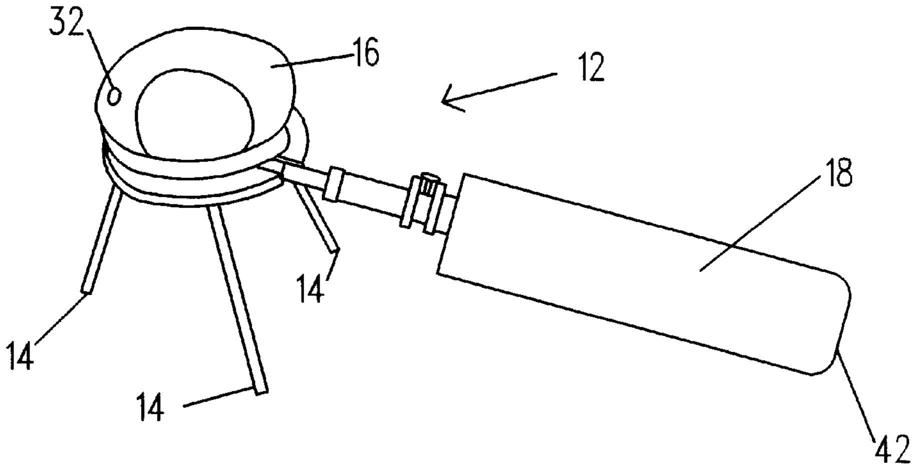

FIG. 2 shows a stove 12 of the invention, as assembled from components shown in FIG. 1. At this level of detail, readily discernible are the three legs 14 of a support stand, burner 16, and propane fuel bottle 18.

Figure 3:
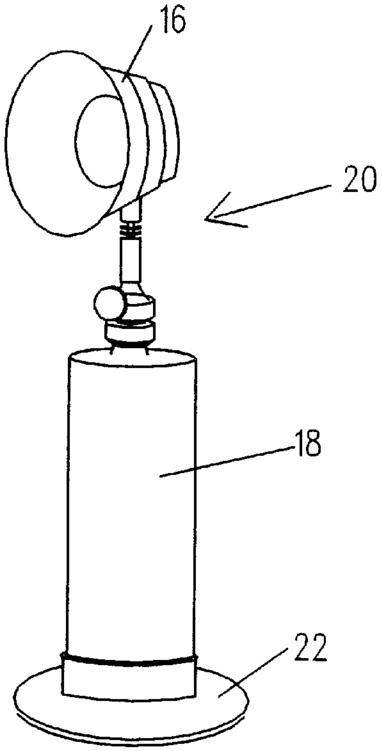

FIG. 3 shows a heater 20 of the invention, also assembled from components of FIG. 1. At the illustrated level of detail, one sees burner 16, propane bottle 18, and cup stand 22. The bottle has a sliding force-fit in the cup portion of stand 22, to lend stability to the heater.

Figure 4:
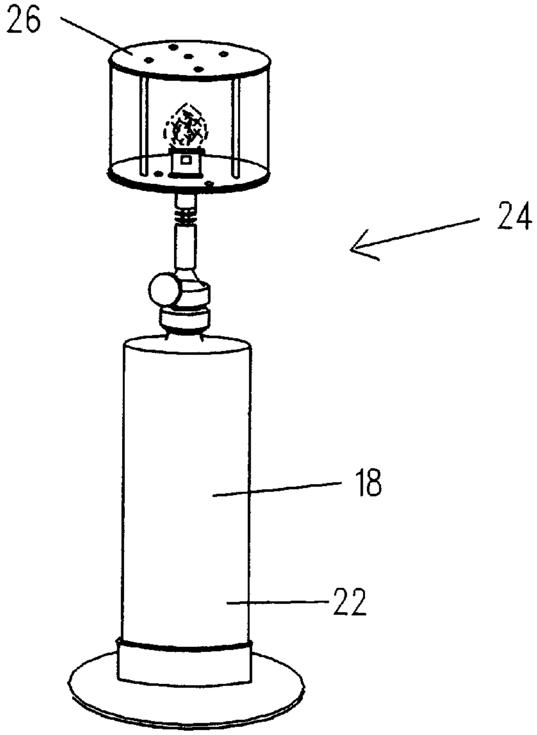

FIG. 4 shows a lantern 24 of the invention, composed of parts from the case of FIG. 1. Visible are fuel bottle 18, cup stand 22, and light chamber 26.

Figure 5:
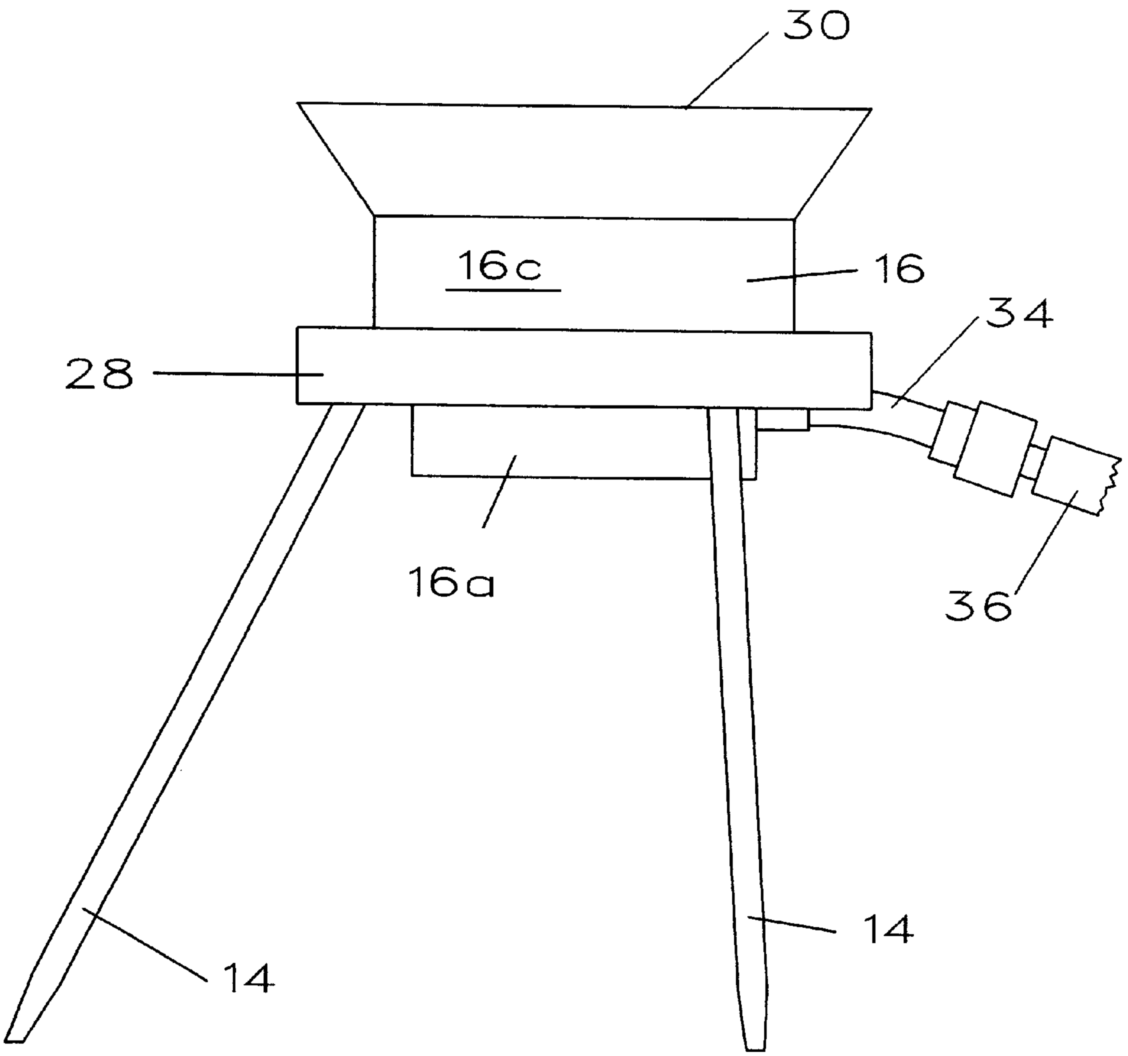
FIG. 5 is an elevational view of a portion of the stove of FIG. 2.

Considering now the stove in greater detail in FIG. 5, legs 14 combine with ring 28 to form the support stand. Burner 16 sits in the ring. The burner extends above the ring, to space a cooking pot, frying pan, tea kettle, etc. from the ring. Thus, a cooking pot, frying pan, tea kettle, etc., can be placed on the rim 30 of the burner, to heat the contents of pot, pan, kettle. Exhaust gas from the burner is discharged through hole 32 (FIG. 2) in the conical wall of the burner. Combustible gas-air mixture is supplied to the burner through elbow 34 attached to the end 36 of a component combining the functions of gas valve and air aspiration. The elbow sits in a slot in ring 28.

Figure 6:
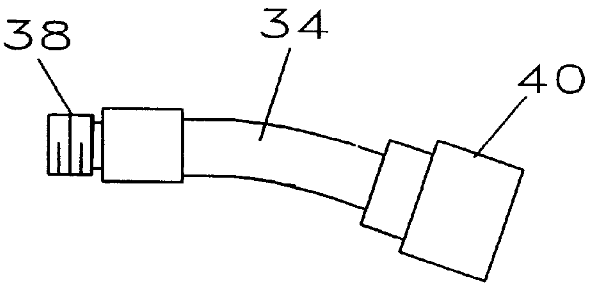
FIG. 6 is a detail view of one of the components appearing in FIG. 5.

FIG. 6 shows elbow 34 in more detail. It is a curved pipe or flexible tubing with external threads 38 on one end and internal threads on the other end 40. Threads 38 join to burner 16, while end 40 provides a threaded connection with end 36 of the valve/aspirator unit. The curvature or flexibility accomplishes the goal that the base 42 (FIG. 2) of the propane fuel bottle 18 can rest on a support surface, while, at the same time, the three legs 14 of the support stand keep rim 30 sufficiently close to horizontal to provide good support for a pot, pan or kettle. The lower ends of legs 14 taper narrower, so that they can be pushed into the ground, should such be necessary to assure a horizontal rim 30. The propane fuel bottle 18 (FIG. 2), aligned with the valve/aspirator unit, inclines upwards from its support at base 42, to assure that gaseous, rather than liquid, propane is always at the top of the bottle for feeding the burner during operation of the stove. While part of the weight of bottle 18 and its contents is carried by the support surface at base 42, another part is carried by the support stand and its legs, to stabilize the support stand.

Figure 7:
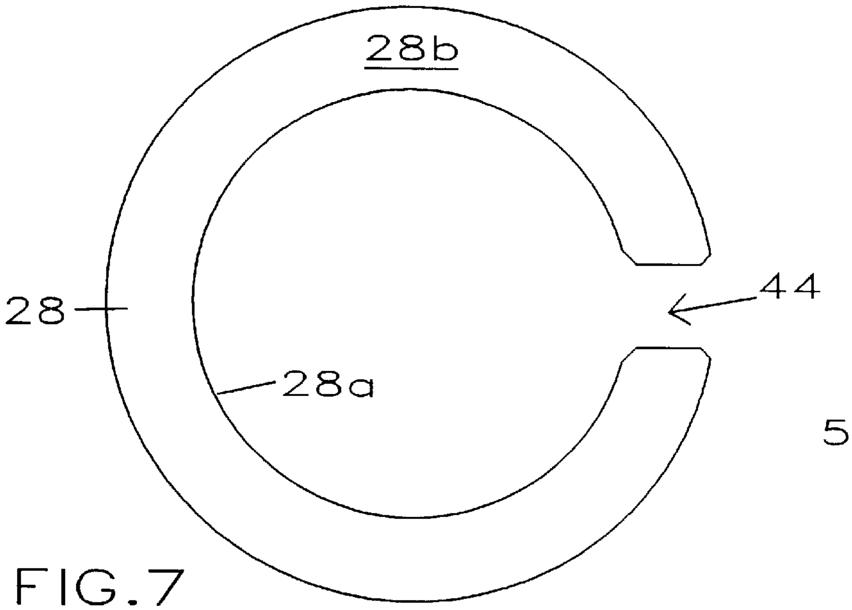
FIGS. 7 to 9 are, respectively, top, side, and bottom views of another of the components appearing in FIG. 5.
Figure 8:
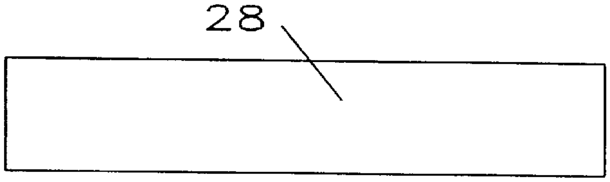
Figure 9:
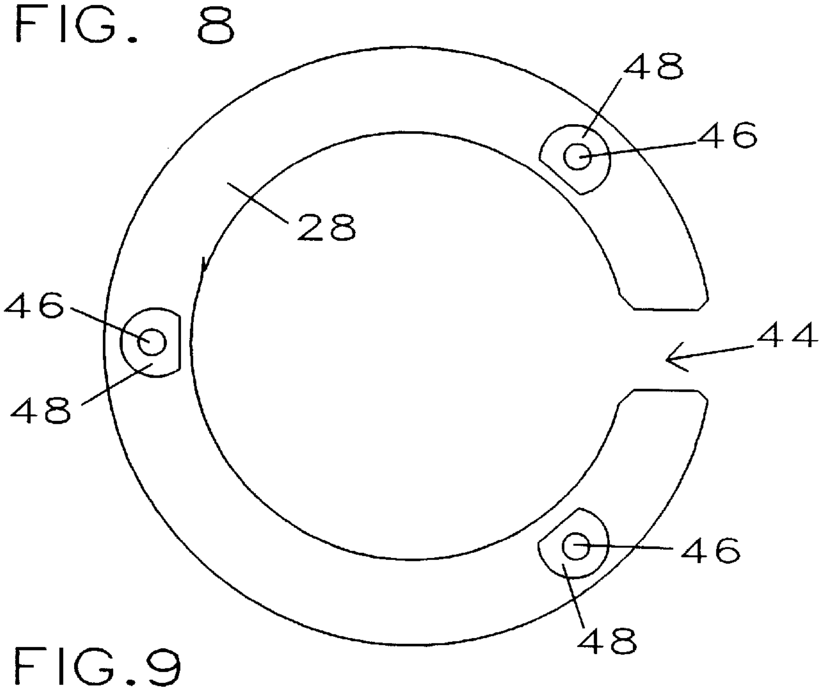

FIGS. 7–9 show ring 28 in detail. The ring may be made of aluminum, for example. This embodiment has a slot 44, so that the ring may be described as a C-ring. The ring is drilled and tapped at three locations 120-degrees apart, so that legs 14 may be screwed in place. The axes of the drilled holes 46 tilt outwards, so that legs 14 are directed outwards, to provide greater stability for the resulting tripod support stand. Holes 46 are each counterbored to provide inclined surfaces 48, against which shoulders on the legs 14 may tighten, to provide solid securement of the legs. One of the holes 46 is directly opposite to slot 44, so that the other two holes 46 lie at equal distances from the slot.

Figure 10:
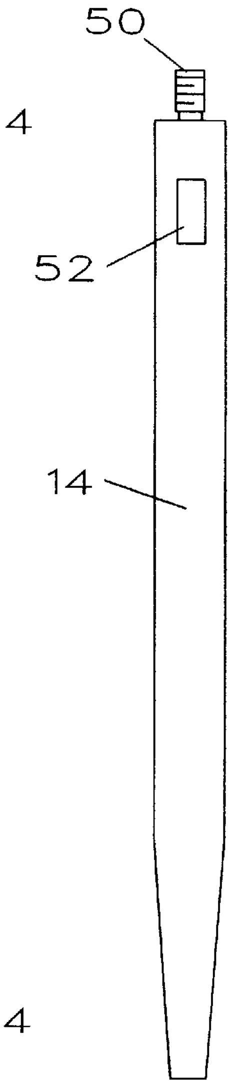
FIG. 10 is a plan view of a leg appearing in FIG. 5.

FIG. 10 shows a typical one of the three legs 14. It is threaded at its upper end 50. Those threads match the threads in holes 46. A land 52 and an identical land right on the other side of the leg provide a seat for a wrench for tightening the attachment of the leg to ring 28.

Figure 11:
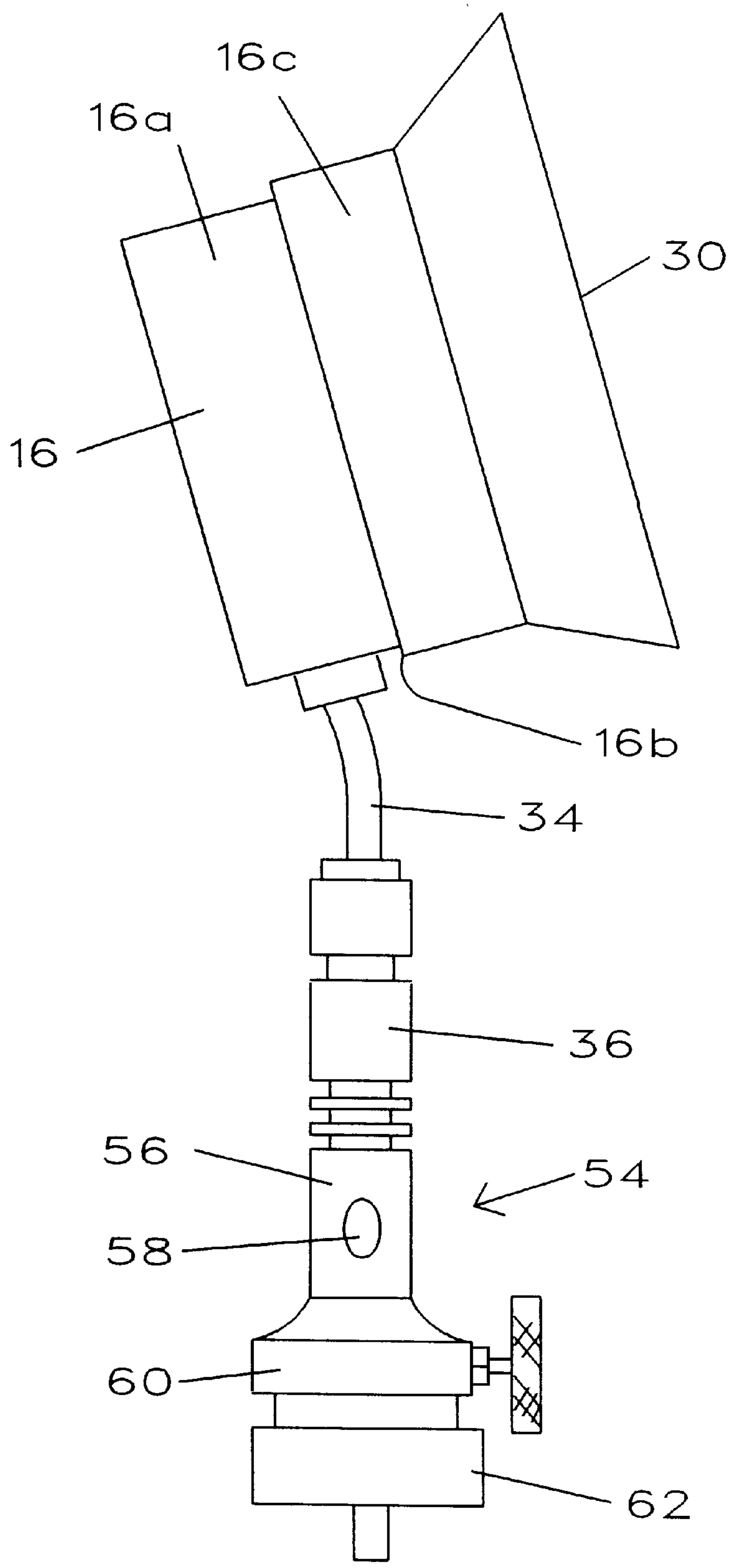
FIG. 11 is an elevational view of a portion of the heater of FIG. 3.

FIG. 11 details the upper portion of the heater of the invention. Burner 16 is supported on elbow 34 connected to end 36 of valve/aspirator unit 54. The plane of rim 30 is tilted back from vertical, for example by 17-degrees, due to the curvature in elbow 34. This tilt is beneficial for directing heat from the burner upwards onto personnel, when the heater is set on the floor. In cases where the elbow 34 is made of flexible tubing, the tubing is of limited flexibility, so that the burner will not flop down, but rather keeps the attitude into which it is adjusted by flexure of the tubing.

In contrast to the curved elbow 34, the valve/aspirator unit 54 is straight and includes an aspirator section 56, where holes 58 allow the entrainment of air into the gaseous fuel, a valve section 60 for controlling the fuel flow rate, and a cap 62, which can be screwed onto fuel bottle 18, to open the bottle to valve section 60.

It will be apparent from a comparison of FIG. 11 with FIG. 5 that all of the structure illustrated in FIG. 11 occurs identically in FIG. 5, the only difference being one of position. In FIG. 11, the plane of rim 30 of the burner is tilted slightly from vertical, while, in FIG. 5, rim 30 is horizontal. In FIG. 5, the base 16*a* of the burner has a snug, sliding fit with the inner diameter 28*a* (FIG. 7) of ring 28, and the circumferential step 16*b* on the midsection 16*c* of the burner, at the junction between the base 16*a* and the midsection 16*c*, rests on the upper surface 28*b* (FIG. 7) of ring 28. Elbow 34 sits in and extends through slot 44 of ring 28. Slot 44, which is thus sized to accommodate elbow 34, is particularly advantageous, because it makes it possible to utilize a burner design in which the gas/air mixture is introduced into the burner in the side of the base 16*a* beneath the upper surface 28*b*, as far back from the midsection as possible. This provides best usage of space in the burner and lowers the center of gravity of the stove, as well.

Figure 12:
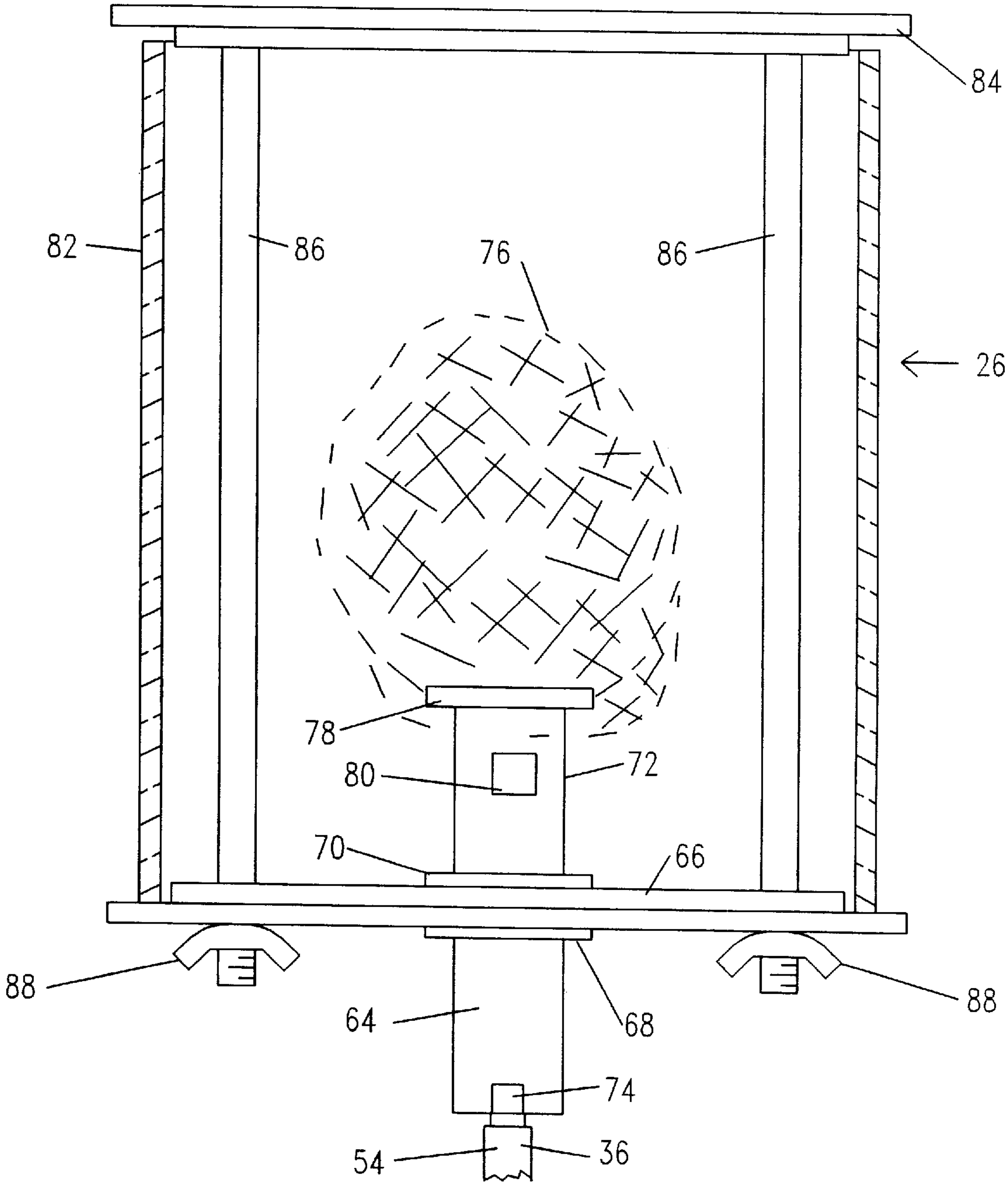
FIG. 12 is an elevational, partially cross sectional view of a portion of the lantern of FIG. 4.

FIG. 12 details the light chamber 26 of the lantern. The light chamber is carried upright, atop the straight valve/aspirator unit 54 by threaded connection of tubular fitting 64 to the end 36. The floor 66 of the light chamber rests on fitting 64, with interposition of a washer 68. Resting on the floor, with interposition of washer 70, is the tubular mantle-securement fitting 72. Fitting 72 has a ring flange 74 for securement of the mantle 76. Each fitting has lands, 78 and 80, for application of a wrench. The light chamber is laterally enclosed by transparent glass cylinder 82. A roof 84 is held above the light chamber by posts 86. The floor and the roof are both stepped inwards, for retention of cylinder 82. The light chamber is held closed by wingnuts 88.

Figure 13:
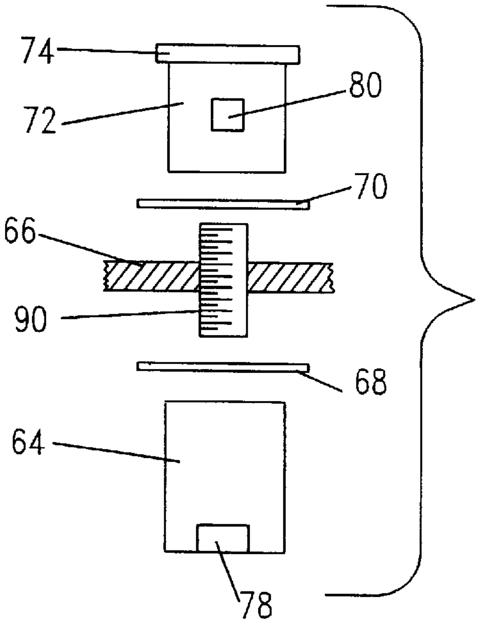
FIG. 13 is an exploded view of a part of the structure of FIG. 12.

FIG. 13 is an exploded view to show details of the connection of the light chamber. It reveals that fittings 64 and 72 screw onto a tapered threaded nipple 90.

Figure 14:
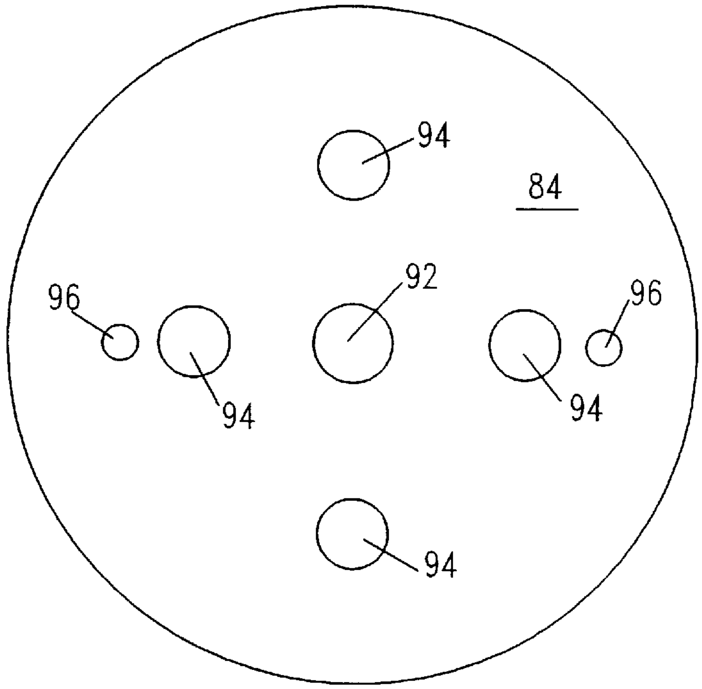
FIGS. 14 and 15 are, respectively, top and side views of the top of the lantern in FIG. 12.
Figure 15:
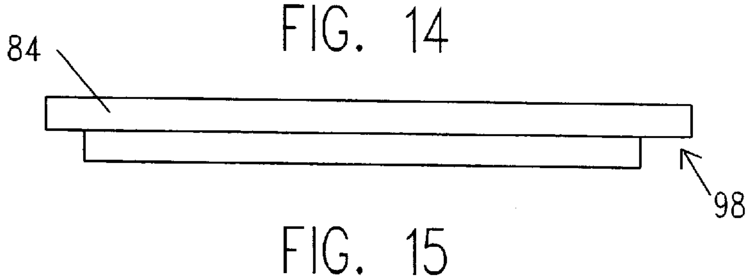

FIGS. 14 and 15 illustrate provide top and side views of light chamber roof 84. The roof has a centrally positioned exhaust hole 92 and four radially located exhaust holes 94. Threaded holes 96 receive the upper ends of posts 86. The side view of FIG. 15 indicates the presence of circumferential step 98.

Figure 16:
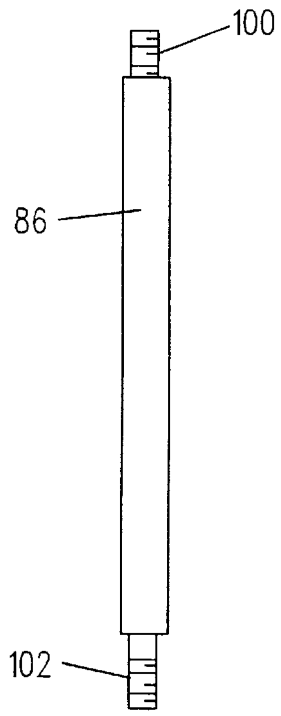
FIG. 16 is a plan view of a post of the lantern of FIG. 12.

FIG. 16 shows the details of a post 86, threaded at upper end 100, for securement in holes 96, and at lower end 102, for securement of wingnuts 88.

On the basis of the above, reference is now made back to FIG. 1, where one will recognize in case 10 legs 14, burner 16, propane bottle 18, light chamber 26, ring 28, elbow 34, and valve/aspirator unit 54.

Further illustrative of the invention is the following Example.

In a preferred example of the invention, burner 16 is an infrared burner, where no flame is visible. A suitable burner of this type and having the configuration as discussed and illustrated herein, together with a valve/aspirator unit, a cup stand, and, optionally, a propane bottle (14 oz. capacity), of the types also as discussed and illustrated, are marketed as the Magna MULTI-PURPOSE INFRARED TOOL & HEATER by Magna Industries, Inc., of Cleveland, Ohio.

It is to be understood that the above are merely preferred modes of carrying-out the invention and that various changes and alterations can be made without departing from the spirit and broader aspects of the invention as defined by the claim set forth below and by the range of equivalency allowed by law.

What is claimed is:

1. A kit for assembly of a stove, heater, or lantern as options, the kit comprising a straight valve/aspirator unit common to all of the options, a burner common to the stove and the heater, and an elbow common to the stove and the heater, the stove further comprising a support stand with a ring, the burner seating in assembly on an upper surface of the ring, the elbow connecting in assembly from the valve/aspirator unit to the burner below the upper surface.

2. A kit as claimed in claim 1, the ring being slotted, the elbow passing in assembly through the slot when the burner is seated in assembly on the ring.

3. A kit as claimed in claim 1, the elbow having a curvature such that a base of a connected propane fuel bottle can rest in assembly on a support surface, with the bottle tilting upwards to the support stand, while, at the same time, the support stand in assembly keeps sufficiently close to horizontal to provide support for a pot, pan or kettle.

4. A kit as claimed in claim 1, wherein the lantern comprises a light chamber connectable upright, atop said unit.

5. A kit as claimed in claim 1, the burner extending above the ring, to space a pot, pan or kettle from the ring.

6. A kit as claimed in claim 1, the ring having a slot sized to accommodate the elbow.

7. A stove comprising a burner and a stand for the burner, the burner carrying an elbow arranged for connection of a tilted fuel bottle, further comprising a straight valve/aspirator unit interposed between the elbow and the tilted fuel bottle, the stand comprising a C-ring having ends spaced to provide a slot (44), the burner seated on an upper surface of the ring, with the elbow connected from the valve/aspirator unit to the burner below the upper surface.

8. A stove as claimed in claim 7, further comprising liquid and gaseous propane in the fuel bottle.

9. A stove as claimed in claim 7, the burner extending above the ring, to space a pot, pan or kettle from the ring.

10. A stove as claimed in claim 7, the ring having a slot sized to accommodate the elbow.

11. A stove comprising a burner and a stand for the burner, the burner carrying an elbow arranged for connection of a tilted fuel bottle, further comprising a straight valve/aspirator unit interposed between the elbow and the tilted fuel bottle, the stand comprising a C-ring having ends spaced to provide a slot (44), the burner seated on an upper surface of the ring, with the elbow connected from the valve/aspirator unit to the burner below the upper surface, the elbow passing through the slot.

* * * * *